United States Patent
Wang et al.

(10) Patent No.: US 9,708,430 B2
(45) Date of Patent: Jul. 18, 2017

(54) VINYLIDENE FLUORIDE COPOLYMER AND PREPARATION METHOD THEREFOR

(71) Applicant: ZHONGHAO CHENGUANG RESEARCH INSTITUTE OF CHEMICAL INDUSTRY COMPANY LIMITED, Zigong, Sichuan (CN)

(72) Inventors: Xianrong Wang, Zigong (CN); Bin Li, Zigong (CN); Jinlong Yu, Zigong (CN); Tingjian Zhang, Zigong (CN)

(73) Assignee: Zhonghao Chenguang Research Institute Of Chemical Industry Company Limited (CN)

( * ) Notice: Subject to any disclaimer, the term of this patent is extended or adjusted under 35 U.S.C. 154(b) by 0 days.

(21) Appl. No.: 15/111,427

(22) PCT Filed: Oct. 16, 2014

(86) PCT No.: PCT/CN2014/088744
§ 371 (c)(1),
(2) Date: Jul. 13, 2016

(87) PCT Pub. No.: WO2015/085824
PCT Pub. Date: Jun. 18, 2015

(65) Prior Publication Data
US 2017/0015771 A1    Jan. 19, 2017

(30) Foreign Application Priority Data
Dec. 9, 2013   (CN) ........................... 2013 1 0660130

(51) Int. Cl.
*C08F 214/22*    (2006.01)
*C08F 2/26*      (2006.01)
*C08F 2/00*      (2006.01)
*C08F 234/02*    (2006.01)

(52) U.S. Cl.
CPC ............ *C08F 214/22* (2013.01); *C08F 2/005* (2013.01); *C08F 2/26* (2013.01); *C08F 2500/12* (2013.01); *C08F 2800/20* (2013.01)

(58) Field of Classification Search
CPC ........ C08F 2/24; C08F 214/22; C08F 224/00; C08F 2800/20
USPC ...................................................... 526/247
See application file for complete search history.

(56) References Cited

U.S. PATENT DOCUMENTS

| | | | | |
|---|---|---|---|---|
| 5,000,547 A | * | 3/1991 | Squire ................... | C08F 234/02 252/589 |
| 6,201,084 B1 | * | 3/2001 | Abusleme ........... | C08F 214/222 526/206 |
| 6,335,408 B1 | * | 1/2002 | Russo ..................... | C04B 24/12 526/209 |
| 6,406,517 B1 | | 6/2002 | Avery et al. | |

FOREIGN PATENT DOCUMENTS

| | | |
|---|---|---|
| CN | 101296950 | 10/2008 |
| CN | 101652392 | 2/2010 |
| CN | 101925619 | 12/2010 |
| CN | 102356469 | 2/2012 |
| CN | 103694395 | 4/2014 |
| JP | 2006/153594 | 6/2006 |

OTHER PUBLICATIONS

International Search Report mailed Jan. 23, 2015.
Written Opinion of the International Searching Authority mailed Jan. 23, 2015.

* cited by examiner

*Primary Examiner* — Fred M Teskin
(74) *Attorney, Agent, or Firm* — Baker Donelson; Cong Ding

(57) ABSTRACT

Provided in the present invention is a vinylidene fluoride copolymer. Same is acquired via a polymerization reaction taking place at conditions of 30-100° C. and 2-7 MPa with vinylidene fluoride, tetrafluoroethylene, and perfluorinated dioxole or C1-4 alkoxy-substituted perfluorinated dioxole as raw materials, with an initiator added into an emulsion consisting of water, fluorinated emulsifier, a chain transfer agent, a pH regulator, and an antifouling agent, and then via steps of separation, purification, refinement, condensation, washing, drying, and granulation, where the molar ratio of vinylidene fluoride, tetrafluoroethylene, and perfluorinated dioxole or C1-4 alkoxy-substituted perfluorinated dioxole is 13-17:2-4:1-3. The vinylidene fluoride copolymer of the present invention provides excellent transparency, flexibility, and solubility, is widely applicable in optical apparatus such as lenses, and is for use in specialty films in the fields of solar panels and of capacitors as a fuel cell membrane, a transparent and tough coating, and a large-sized blown object.

10 Claims, No Drawings

VINYLIDENE FLUORIDE COPOLYMER AND PREPARATION METHOD THEREFOR

CROSS REFERENCE TO RELATED APPLICATIONS

This application is a §371 National State Application of PCT/CN2014/088744 filed Oct. 16, 2014 which claims priority to CN 201310660130.3 filed Dec. 9, 2013, which are hereby incorporated by reference in their entirety.

TECHNICAL FIELD

The present invention relates to the field of chemical industrial, particularly relates to vinylidene fluoride copolymer and the preparation method thereof.

BACKGROUND ART

PVDF (polyvinylidene fluoride) resin has excellent chemical stability, resistance to high-strength, weather resistance, ultraviolet resistance, electrical insulation, non-hygroscopicity and self-extinguishing. In order to make PVDF to be more suitably used under more stringent conditions, it is necessary to improve the properties of the PVDF homopolymer such as transparency and flexibility. After PVDF is modified by introducing tetrafluoroethylene and perfluorinated dioxole monomers, the amorphous fluorocarbon resin is formed, which not only has the same properties as that of vinylidene fluoride, but also has characteristics of good transparency, flexibility and solubility, etc. The amorphous fluorocarbon resin is widely used for lenses and other optical apparatus, used as a special film for solar panels, piezoelectric and capacitive application, used as a fuel cell membrane, a transparent and tough coating, used for large-sized blown objects, and so on.

CN102083873A discloses vinylidene fluoride/2,3,3,3-tetrafluoropropene copolymers. The copolymers have excellent optical properties, corrosion resistance and electrical properties, and very low haze. Although the final product of thin film is transparent, there still exists certain haze prohibiting its widespread use.

U.S. Pat. No. 5,140,082 discloses a vinylidenefluoride-trifluoromethylethylene copolymer (3,3,3-trifluoropropene) (TFP). The copolymer is synthesized by bulk polymerization, solution polymerization, suspension polymerization and emulsion polymerization, wherein all the TFP is in the initial charge. This copolymer has excellent weathering resistance, corrosion resistance, and electrical characteristics. However, the invention does not relate to the optical transparency of the copolymer.

CN 102161724B discloses a quinary polymerization fluororesin with high transparency and a synthesis method and application thereof. The fluororesin is prepared by copolymerizing the following monomers, 30-45% of ethylene, 40-50% of tetrafluoroethylene, 1-7% of vinyl fluoride, 2-10% of vinylidene fluoride, 3-15% of chlorotrifluoroethylene, based on the mole percent in the copolymer. However, this resin has a melting point of 240-280° C., and thus has higher requirements on the processing equipment, and has a narrow melt processing temperature, thereby having influenceon its application.

SUMMARY OF THE INVENTION

One object of the present invention is to provide a vinylidene fluoride copolymer and the preparation method thereof.

For this purpose, the present invention provides a vinylidene fluoride copolymer, which is synthesized by polymerizing vinylidene fluoride, tetrafluoroethylene, and perfluorinated dioxole or C1-4 alkoxy-substituted perfluorinated dioxole in a molar ratio of 13-17:2-4:1-3.

Wherein, the C1-4 alkoxy-substituted perfluorinated dioxole is perfluorinated dimethyl dioxole.

The vinylidene fluoride copolymer has a melt point in a range of 100-150° C., and has a melt flow index of 0-60 g/10 min, at a temperature of 230° C. under a load of 5 kg. Preferably, the vinylidene fluoride copolymer has a melt flow index of 2.1-10 g/10 min.

The present invention further provides a preparation method of said vinylidene fluoride copolymer, which comprises the following steps: performing a polymerization reaction by using vinylidene fluoride, tetrafluoroethylene, and perfluorinated dioxole or C1-4 alkoxy-substituted perfluorinated dioxole as raw materials, in an emulsion consisting of water, fluorinated emulsifier, a chain transfer agent, a pH regulator and an antifouling agent, adding an initiator thereto, at conditions of a temperature of 30-100° C. and a pressure of 2-7 MPa, to give a product solution (the pressure within the reaction vessel is controlled to be 2-7 MPa by introducing the mixed gas of vinylidene fluoride, tetrafluoroethylene, and perfluorinated dioxole or C1-4 alkoxy-substituted is perfluorinated dioxole into the reaction vessel); then subjecting the product solution to the steps of separation, purification, refinement, condensation, washing, drying, and granulation.

Wherein, the water is deionized water with an electrical conductivity $\leq 0.2$ μS/cm, and the water is used in an amount of two-thirds by the volume of the reaction vessel.

In one embodiment, the preparation method of the fluorinated emulsifier comprises the following steps: mixing fluorinated alkyl carboxylic acid or fluorinated alkyl sulfonic acid, or a salt thereof with a perfluoroalkylpolyether surfactant in a weight ratio of 3:1; adding water thereto to give a microemulsion with a concentration of 5-10%. The perfluoroalkylpolyether surfactant is optionally perfluoroalkylpolyether with a molecular weight of 400-1,000 Dalton; such as $CF_3O(CF_2-CF(CF_3)O)_m(CF_2O)_nCF_3$, wherein m/n=20, the number-average molecular weight is 760. The fluorinated alkyl carboxylic acid or the fluorinated alkyl sulfonic acid, or the salt thereof has a molecular weight of 431-679 Dalton, and is optionally a perfluorinated alkyl carboxylate, a perfluorinated alkyl sulfonate, a partially fluorinated alkyl carboxylate or a partially fluorinated alkyl sulfonate, such as $CF_3-O-(CF_2)_3-O-CFH-CF_2-COONH_4$.

The chain transfer agent comprises, but not limited to, isopropanol, acetone, diethyl malonate, propane or carbon tetrachloride, and the chain transfer agent is used in an amount of 0.001-0.63% by weight of water.

The pH regulator comprises, but not limited to, ammonia water, sodium acetate, sodium carbonate, sodium borate or disodium hydrogen phosphate.

The initiator comprises, but not limited to, diisopropyl peroxydicarbonate (IPP), di-t-butyl peroxide, perfluoropropionyl peroxide compound, and the initiator is used in an amount of 0.01-5% by weight of water.

The antifouling agent is optionally paraffin or hydrocarbon oil, and the antifouling agent is used in an amount of 0.01-0.5% by weight of water. Any long-chain saturated paraffin or hydrocarbon oil may be used to play a role in anti-fouling as long as it can prevent polymer from adhering to the parts of the reaction vessel. Paraffin or hydrocarbon oil is used in an amount of 5 mg/cm$^2$, based on the internal surface area of reaction vessel.

In the polymerization reaction according to the present invention, the temperature of polymerization varies in a range of 30-100° C. depending on the initiator used. In the case that the temperature is lower than 30° C., the copolymerization rate may be too slow, so that this temperature is not suitable for efficient reaction in an industrial scale; and in the case that the temperature is higher than 100° C., the initiating efficiency of the initiator may be inhibited, and the obtained polymer may have a high structural defect (in macromolecular chains, the distribution of vinylidene fluoride and chlorotrifluoroethylene is irregular, branching and there also exists microgelation); during the polymerization, it is difficult to maintain the stability of the emulsion, hard lumps may also occur and hinders the reaction rate; furthermore, the mechanical properties and processing performances of the copolymer prepared under high temperature may deteriorate.

The pressure of the polymerization reaction is preferably 2-5 MPa. The desired polymerization pressure is firstly maintained by adjusting the amount of monomer in the gaseous mixture. The polymerization pressure can be set within the above range, because in the case that the pressure is lower than 2 MPa, the concentration of the monomer in the polymerization reaction system may be too low to achieve satisfactory reaction rates, furthermore, the molecular weight cannot be effectively increased; in the case that the pressure is higher than 5 MPa, the requirements on the equipment, system and pipelines may be higher, which may increase the production costs.

The polymeric monomer vinylidene fluoride imparts the resin with excellent flexibility, wide range melting processing temperature and good processing flowability. The vinylidene fluoride chain segment in the resin is a hemicrystalline polymer, which is easy to form a polymer with high transparency in the presence of other modified monomers.

The polymeric monomer tetrafluoroethylene enables the polyvinylidene fluoride resin to have good corrosion resistance and chemical stability, while ensureing the resin strength and elongation in the application, rather than make it into an elastomer.

The polymeric monomer perfluorinated dioxole allows the polymer to form an amorphous polymer, and imparts the polymer with excellent optical transparency, flexibility and solubility. However, in the case that the content of the perfluorinated dioxole is low, the copolymer may be not amorphous any more, while it may tend to be a hemicrystalline polymer, decreasing the transparency of the polymer.

The vinylidene fluoride copolymer with high transparency according to the present invention has a low surface tension, and usually dissolves in a polar solvent at ambient temperature to form a stable solution. The available co-solvents are generally dimethylacetamide, dimethylformamide, N-methylpyrrolidone and the like. Such solutions may be coated on a substrate, and air-dried at ambient temperature, or may be treated at the temperature of 150-230° C. to form a bonded coating.

The vinylidene fluoride copolymer according to the present invention may be applied on various substrates, such as metal, plastics, ceramic, glass and fabric to form a high quality protective film and coating with very low haze. Such films may be prepared by conventional methods such as casting, dipping, spraying, brush coating, and so on, then by heat treatment to form a uniform coating.

A transparent and glossy coating with a low haze may be formed with the copolymers according to the present invention, and the haze thereof is less than about 5%. This coating has a wide range of applications in forming thin film materials for decoration which require high gloss appearance (including high-definition image (DOI appearance)), for example, it can be used as outer walls of a building or exterior body panels of an automotive.

BEST MODE FOR CARRYING OUT THE INVENTION

The following examples are provided to further describe the present invention, but they are not construed as limitations to the present invention. Unless otherwise specified, the technical means adopted in the present invention are conventional means known by those skilled in the art, and the materials used are commercially available.

The fluorinated emulsifier microemulsion used in the following examples is prepared by the following steps: mixing 300 g of $CF_3O(CF_2—CF(CF_3)O)_m(CF_2O)_nCF_3$ (wherein m/n=20, the number-average molecular weight is 760) and 900 g of $CF_3—O—(CF_2)_3—O—CFH—CF_2—COONH_4$ in a glass reactor equipped with a stirrer under appropriate stirring, and adding 22.8 kg of deionized water with the electrical conductivity≤0.2 µS/cm to form the fluorinated emulsifier microemulsion with the concentration of 5%.

In the following examples, the percentage of each polymeric monomer is mole percentage.

EXAMPLE 1

Vinylidene Fluoride Copolymer and Preparation Thereof 33.3 L of deionized water was added into a vertical stainless steel reaction kettle with a volume of 50 L. The oxygen in the reaction kettle was removed three times by bubbling nitrogen, until the content of oxygen was 25 ppm or less. 80 g of fluorinated emulsifier emulsion and 400 ml of liquid paraffin (it is a liquid at room temperature) were added into the reaction kettle. The mixture in the reaction kettle was stirred at a stirring speed of 200 rpm, and heated to the temperature of 60° C. The mixed monomers containing 75% of vinylidene fluoride, 15% of tetrafluoroethylene, and 10% of Perfluorinated dimethyl between two oxygen heterocyclic amylene ("PDD") were added into the reaction kettle to make the pressure increase to 3.5 MPa. After the system was stabilized, 40 g of isopropanol was added into the reaction kettle by a metering pump; a few minutes later, 40 ml of IPP (diisopropyl peroxydicarbonate) was added thereto to initiate the polymerization reaction. During the polymerization reaction, the mixed monomers were added continuously into the reaction kettle to keep the pressure at 3.5 MPa. The reaction was terminated when the latex solid content in the reaction kettle reached 30%. The unreacted monomers were recovered, the polymer emulsion was discharged, and paraffin and other impurities were filtrated. A small amount of ammonium bicarbonate was added into the polymer emulsion, and the clear liquid was discarded. The mother liquor was washed with deionized water to the conductivity of 5 µS/cm or less, dried in a vacuum oven at 120° C. for 24 hours, and mechanically grounded at room temperature. The obtained sample was detected.

The content of unit derived from PDD monomer in the copolymer was measured utilizing mass balance by the method disclosed in U.S. Pat. No. 6,262,209.

The melting point was measured using differential scanning calorimetry (DSC). Since the thermal history of the sample may affect the measurement of $T_m$, the sample was heated to 250° C. at the heating rate of 10° C./min, cooled, then heated at the heating rate of 10° C./min again. The endothermic peak temperature observed in the process of reheating the sample was reported as $T_m$.

By differential scanning calorimetry, the haze of the thin film was measured with a WGT-S luminous transmittance and haze determinator produced by Shanghai Jingke Industrial Co., Ltd. Haze refers to the ratio of the luminous flux of diffuse transmission to the total luminous flux transmitted through the sample, expressed as a percentage; a light scattering index of the sample is also provided. The luminous transmittance refers to the ratio of luminous flux transmitted through the sample to the luminous flux on the sample, expressed as a percentage.

The melt flow rate (MFR) was measured according to GB/T14049-2008. The measurement temperature was 230° C., and the load was 5 kg. The characteristics of the sample are shown in Table 1.

TABLE 1

Characteristics of vinylidene fluoride copolymer

| Melt point ° C. | Haze % | Luminous transmittance % | MFI (230° C., 5 kg) | Molar content of PDD % |
|---|---|---|---|---|
| 141 | 5 | 95.3 | 10 g/10 min | 8.9% |

EXAMPLE 2

Vinylidene Fluoride Copolymer and Preparation Thereof 33.3 L of deionized water was added into a vertical stainless steel reaction kettle with a volume of 50 L. The oxygen in the reaction kettle was removed three times by bubbling nitrogen, until the content of oxygen was 25 ppm or less. 60 g of fluorinated emulsifier emulsion and 400 ml of liquid paraffin (it is a liquid at room temperature) were added into the reaction kettle. The mixture in the reaction kettle was stirred at a stirring speed of 200 rpm, and heated to the temperature of 50° C. The mixed monomers containing 80% of vinylidene fluoride, 15% of tetrafluoroethylene, and 5% of PDD were added into the reaction kettle to make the pressure increase to 3.5 MPa. After the system was stabilized, 30 g of isopropanol was added into the reaction kettle by a metering pump; a few minutes later, 30 g of perfluoropropionyl peroxide compound was added thereto to initiate the polymerization reaction. During the polymerization reaction, the mixed monomers were added continuously into the reaction kettle to keep the pressure at 3.5 MPa. The reaction was terminated when the latex solid content in the reaction kettle reached 30%. The unreacted monomers were recovered, the polymer emulsion was discharged, and paraffin and other impurities were filtrated. A small amount of ammonium bicarbonate was added into the polymer emulsion, and the clear liquid was discarded. The mother liquor was washed with deionized water to the conductivity of 5 µS/cm or less, dried in a vacuum oven at 120° C. for 24 hours, and mechanically grounded at room temperature. The obtained sample was detected.

The content of unit derived from PDD monomer in the copolymer was measured utilizing mass balance by the method disclosed in U.S. Pat. No. 6,262,209.

The melting point was measured using differential scanning calorimetry (DSC). Since the thermal history of the sample may affect the measurement of $T_m$, the sample was heated to 250° C. at the heating rate of 10° C./min, cooled, then heated at the heating rate of 10° C./min again. The endothermic peak temperature observed in the process of reheating the sample was reported as $T_m$.

By differential scanning calorimetry, the haze of the thin film was measured with a WGT-S luminous transmittance and haze determinator produced by Shanghai Jingke Industrial Co., Ltd. Haze refers to the ratio of the luminous flux of diffuse transmission to the total luminous flux transmitted through the sample, expressed as a percentage; a light scattering index of the sample is also provided. The luminous transmittance refers to the ratio of luminous flux transmitted through the sample to the luminous flux on the sample, expressed as a percentage.

The melt flow rate (MFR) was measured according to GB/T14049-2008. The measurement temperature was 230° C., and the load was 5 kg. The characteristics of the sample are shown in Table 2.

TABLE 2

Characteristics of vinylidene fluoride copolymer

| Melt point ° C. | Haze % | Luminous transmittance % | MFI (230° C., 5 kg) | Molar content of PDD % |
|---|---|---|---|---|
| 145 | 3.5 | 97.3 | 5 g/10 min | 4.5% |

EXAMPLE 3

Vinylidene Fluoride Copolymer and Preparation Thereof

The process of this example was essentially the same as that of Example 1, except that 30 g of t-butyl peroxide was added in the reaction kettle, and the mixed monomers contain 85% of vinylidene fluoride, 10% of tetrafluoroethylene, and 15% of PDD. The characteristics of this sample are shown in Table 3.

EXAMPLE 4

Vinylidene Fluoride Copolymer and Preparation Thereof

The process of this example was essentially the same as that of Example 1, except that 1666.65 g of fluorinated emulsifier microemulsion and 3.33 g of IPP were added in the reaction kettle, and the mixed monomers contain 65% of vinylidene fluoride, 20% of tetrafluoroethylene, and 15% of PDD. The characteristics of this sample are shown in Table 3.

EXAMPLE 5

Vinylidene Fluoride Copolymer and Preparation Thereof

The process of this example was essentially the same as that of Example 1, except that 0.33 g of fluorinated emulsifier microemulsion and 1666.65 g of IPP were added in the reaction kettle. The characteristics of this sample are shown in Table 3.

EXAMPLE 6

Vinylidene Fluoride Copolymer and Preparation Thereof

The process of this example was essentially the same as that of Example 1, except that 40 g of ammonium perfluorocaprylate, rather than fluorinated emulsifier, was added in the reaction kettle. The characteristics of this sample are shown in Table 3.

EXAMPLE 7

Vinylidene Fluoride Copolymer and Preparation Thereof (Comparative Example 1)

The process of this example was essentially the same as that of Example 1, except that the mixed monomers contain 65% of vinylidene fluoride and 35% of tetrafluoroethylene. The characteristics of this sample are shown in Table 3.

EXAMPLE 8

Vinylidene Fluoride Copolymer and Preparation Thereof (Comparative Example 2)

The process of this example was essentially the same as that of Example 1, except that the mixed monomers contain 85% of vinylidene fluoride and 15% of PDD. A elastomeric polymer was obtained in this example. The characteristics of this sample are shown in Table 3.

TABLE 3

Characteristics of vinylidene fluoride copolymers

| | Melt point ° C. | Haze % | Luminous transmittance % | MFI (230° C., 5 kg) | Molar content of PDD % |
|---|---|---|---|---|---|
| Example 3 | 100 | 4.2 | 96.1 | 2.1 g/10 min | 14.1 |
| Example 4 | 130 | 3.5 | 96.8 | 3.3 g/10 min | 13.9 |
| Example 5 | 140 | 3.8 | 96.7 | 4.8 g/10 min | 8.2 |
| Example 6 | 142 | 8.1 | 92.1 | 3.9 g/10 min | 8.7 |
| Comparative Example 1 | 147 | 29.6 | 78.4 | 20.1 g/10 min | 0 |
| Comparative Example 2 | 90 | 3.7 | 96.2 | Flowing too fast | 14.7 |

It can be seen from Tables 1-3 that, the vinylidene fluoride copolymers prepared by using the preparation method according to the present invention have excellent transparency and flexibility, as well as a lower surface tension.

Although, the present invention has been described in detail with general description and specific embodiments, some changes or modifications made to the present invention are obvious to a person skilled in the art on the basis of the present invention. Therefore, these changes or modifications made without departing from the spirit of the present invention fall within the protection scopes of the present invention.

INDUSTRIAL APPLICABILITY

The present invention provides a vinylidene fluoride copolymer, which has excellent transparency, flexibility and solubility, and may be used for optical apparatus such as lenses; used as a special film in the fields of solar panels and capacitors; used as a fuel cell membrane, a transparent and tough coating; and used for large-sized blown objects, and so on.

What is claimed is:

1. A vinylidene fluoride copolymer, wherein the vinylidene fluoride copolymer is synthesized by polymerizing vinylidene fluoride, tetrafluoroethylene, and perfluorinated dioxole or C1-4 alkoxy-substituted perfluorinated dioxole in a molar ratio of 13-17:2-4:1-3.

2. The vinylidene fluoride copolymer of claim 1, wherein the vinylidene fluoride copolymer has a melt point in a range of 100-150° C., and has a melt flow index of 0-60 g/10 min at a temperature of 230° C. and under a load of 5 kg.

3. A preparation method of the vinylidene fluoride copolymer of claim 2, wherein the vinylidene fluoride copolymer is prepared by performing a polymerization reaction by using vinylidene fluoride, tetrafluoroethylene, and perfluorinated dioxole or C1-4 alkoxy-substituted perfluorinated dioxole as raw materials, in an emulsion consisting of water, a fluorinated emulsifier, a chain transfer agent, a pH regulator and an antifouling agent, adding an initiator thereto, at conditions of a temperature of 30-100° C. and a pressure of 2-7 MPa, to give a product solution; then subjecting the product solution to the steps of separation, purification, refinement, condensation, washing, drying, and granulation.

4. The preparation method of claim 3, wherein the water is deionized water with an electrical conductivity ≤0.2 μS/cm, and the water is used in an amount of two-thirds by the volume of a reaction vessel.

5. The preparation method of claim 4, wherein the fluorinated emulsifier is prepared by the following steps: mixing fluorinated alkyl carboxylic acid or fluorinated alkyl sulfonic acid, or a salt thereof with a perfluoroalkylpolyether surfactant in a weight ratio of 3:1; adding water thereto to give a microemulsion with a concentration of 5-10%; and wherein, the perfluoroalkylpolyether surfactant is optionally perfluoroalkylpolyether with a molecular weight of 400-1,000 Dalton; the molecular weight of the fluorinated alkyl carboxylic acid or the fluorinated alkyl sulfonic acid or the salt thereof is 431-679 Dalton.

6. The preparation method of claim 4, wherein the chain transfer agent comprises isopropanol, acetone, diethyl malonate, propane or carbon tetrachloride, and the chain transfer agent is used in an amount of 0.001-0.63% by weight of water.

7. The preparation method of claim 4, wherein the pH regulator comprises ammonia water, sodium acetate, sodium carbonate, sodium borate or disodium hydrogen phosphate.

8. The preparation method of claim 4, wherien the initiator comprises diisopropyl peroxydicarbonate, di-t-butyl peroxide, perfluoropropionyl peroxide compound, and wherein the initiator is used in an amount of 0.01-5% by weight of water.

9. The preparation method of claim 4, wherein the antifouling agent is paraffin or hydrocarbon oil, and the antifouling agent is used in an amount of 5 mg/cm$^2$ based on the internal surface area of reaction vessel.

10. The vinylidene fluoride copolymer of claim 2, wherein the melt flow index is 2.1-10 g/10 min.

* * * * *